(12) United States Patent
Radja et al.

(10) Patent No.: US 8,209,367 B2
(45) Date of Patent: Jun. 26, 2012

(54) RANDOM NUMBER GENERATOR

(75) Inventors: Patrick Radja, Bonnelles (FR); Roland Stoffel, Elancourt (FR)

(73) Assignee: Eads Secure Netowrks, Elancourt (FR)

( * ) Notice: Subject to any disclaimer, the term of this patent is extended or adjusted under 35 U.S.C. 154(b) by 918 days.

(21) Appl. No.: 12/280,767

(22) PCT Filed: Mar. 26, 2007

(86) PCT No.: PCT/FR2007/000519
§ 371 (c)(1),
(2), (4) Date: Sep. 3, 2008

(87) PCT Pub. No.: WO2007/110506
PCT Pub. Date: Oct. 4, 2007

(65) Prior Publication Data
US 2009/0172055 A1    Jul. 2, 2009

(51) Int. Cl.
*G06F 1/02* (2006.01)
(52) U.S. Cl. .......................... 708/251; 708/252
(58) Field of Classification Search .................. 708/252, 708/251
See application file for complete search history.

(56) References Cited

U.S. PATENT DOCUMENTS

| | | | |
|---|---|---|---|
| 5,434,806 A | 7/1995 | Hofverberg | |
| 5,878,075 A | 3/1999 | Frank et al. | |
| 6,480,072 B1 | 11/2002 | Walsh et al. | |
| 6,687,321 B1 | 2/2004 | Kada et al. | |
| 6,754,345 B2 | 6/2004 | Ishimoto et al. | |
| 6,954,770 B1 | 10/2005 | Carlson et al. | |
| 7,293,054 B2 * | 11/2007 | Clements et al. | 708/252 |
| 2002/0156819 A1 * | 10/2002 | Oerlemans | 708/252 |
| 2002/0186086 A1 | 12/2002 | Curiger et al. | |
| 2005/0120065 A1 | 6/2005 | Dirscherl et al. | |
| 2005/0203979 A1 | 9/2005 | Clements et al. | |
| 2006/0244544 A1 * | 11/2006 | Suzuki | 331/57 |

FOREIGN PATENT DOCUMENTS

| | | |
|---|---|---|
| EP | 0 283 758 | 9/1988 |
| EP | 1 458 130 | 9/2004 |
| EP | 1 465 057 | 10/2004 |
| JP | 54 137950 | 10/1979 |

OTHER PUBLICATIONS

Preliminary Search Report from French priority patent application No. FR 0 602 728; Report dated Nov. 23, 2006.
International Search Report from counterpart application No. PCT/FR2007/000519; Report dated Aug. 6, 2007.

* cited by examiner

*Primary Examiner* — Chuong D Ngo
(74) *Attorney, Agent, or Firm* — Miller, Matthias & Hull LLP

(57) ABSTRACT

The invention concerns a random number generator comprising a n-bit LSFR at least one oscillator having at least one delay element introducing a variable delay in the counter feedback loop, and at least one sampling/holding device having at least one input coupled to an output of the oscillator, and at least one output coupled to a input of the LSFR, and a clock input receiving a sampling clock signal at a much lower frequency than the oscillator frequency. Said generator is for example configured to vary the delay introduced by the oscillator delay based on a number q of feedback bits among the n bits of the LSFR output, where q is a an integer such that $1 \leq q \leq n$.

20 Claims, 4 Drawing Sheets

RANDOM NUMBER GENERATOR

CROSS-REFERENCE TO RELATED APPLICATIONS

This application is a U.S. national stage filing of International Patent Application No. PCT/FR2007/000519 filed on Mar. 26, 2007, which claims priority under the Paris Convention to French Patent Application No. 06 02728, filed on Mar. 29, 2006.

FIELD OF THE DISCLOSURE

The present invention pertains in a general manner to the generation of random numbers.

BACKGROUND OF THE DISCLOSURE

Random numbers are used in various encipherment applications, in particular for enciphering the data exchanged in secure communication systems such as professional radiocommunication systems or PMR ("Professional Mobile Radio"). Data encipherment actually requires random numbers such as, for example, secret identification numbers, encipherment keys or initial values for iterative encipherment algorithms, or the like.

A known approach for generating random numbers consists in using a Linear Feedback Shift Register or LFSR. An n-bit LFSR is a pseudo-random number generator which processes a polynomial of degree n. A conventional structure comprises an LFSR of which an input value on 1 bit is provided by the sampled output of an oscillator with high phase noise whose frequency is much higher than the sampling frequency. This input value is called an entropy bit. The LFSR is regulated by a clock signal at the sampling frequency.

This structure, which exhibits in particular the advantage of occupying little silicon surface area and therefore of being well adapted to integrated circuit applications, nevertheless has a drawback. This drawback resides in the fact that the structure generates numbers which, over a long duration, are not totally random, they are correlated with the frequency of the oscillator which is stable since it depends only on the environmental conditions (temperature, voltage, etc.).

Various proposals have been made for increasing the randomness of the numbers generated.

Thus, document U.S. Pat. No. 6,954,770 discloses a structure in which an entropy value on a number N of bits is provided as input to the LFSR, where N is an integer greater than unity. Each entropy bit is provided by the sampled output of a respective oscillator. It is injected as input to one of the shift register elements forming the LFSR, via a logic gate of "Exclusive OR" type coupled additionally to the output of the previous shift register element. This more complex structure does indeed increase the randomness of the numbers generated, but it retains the same drawback described above, that is to say the numbers generated are not totally independent, each oscillator having a stable frequency. Another drawback of this solution is the increase in the power dissipated on account of a larger number of oscillators operating at high frequency.

In document U.S. Pat. No. 6,480,072 it is proposed that the entropy bit supplying an LFSR, or another device such as a CRC ("Cyclic Redundancy Check") circuit, be obtained by sampling the output of a voltage-controlled oscillator or VCO at a much lower sampling frequency. To decrease the predictability of the phase relation which links the output frequency of the VCO and the sampling frequency, the output frequency of the VCO is modified during each sampling period. This modification is obtained by producing a control voltage for the VCO which results from the combination, in an "Exclusive OR" operator, of the sampling clock signal and of the output of an 8-bit LFSR dedicated to this function alone. This proposal also makes it possible to improve the quality of the random numbers generated, but it is also fairly complex and it has the drawback moreover of using analog modules which are easy to pinpoint on a microchip.

SUMMARY OF THE DISCLOSURE

Embodiments of the present invention make it possible to further enhance the randomness of the numbers generated with the aid of an LFSR by reducing the correlation of the numbers generated with the frequency of the oscillator by using an oscillator varying randomly in phase and in frequency by utilizing all the random characteristics of the materials (temperature, location, etc.). They make it possible to minimize the power dissipated by limiting the number of oscillators, and/or to conceal the structure which uses only standard logic cells which are embedded in a set of gates.

A first aspect of the invention thus proposes a random number generator comprising:
- a linear feedback shift register, or LFSR, with n bits, where n is a determined integer;
- at least one oscillator having at least one delay element introducing a variable delay into its feedback loop, and
- at least one sample and hold unit having at least one input coupled to an output of the oscillator, and at least one output coupled to an input of the LFSR, and a clock input receiving a sampling clock signal at a much lower frequency than the frequency of the oscillator.

This generator is configured to vary the delay introduced by the delay element in the feedback loop of the oscillator as a function of a number q of feedback bits from among the n output bits of the LFSR, where q is an integer such that $1 \leq q \leq n$.

A second aspect of the invention proposes a method for generating random numbers by using:
- a linear feedback shift register, or LFSR, with n bits, where n is a determined integer;
- at least one oscillator having at least one delay element introducing a variable delay into its feedback loop; and
- at least one sampler having at least one input coupled to an output of the oscillator, and at least one output coupled to an input of the LFSR, and a clock input receiving a sampling clock signal at a much lower frequency than the frequency of the oscillator.

According to this method, the delay introduced in the feedback loop of the oscillator is varied as a function of a number q of feedback bits from among the n output bits of the LFSR, where q is an integer such that $1 \leq q \leq n$.

The intrinsic structure of the delay element possesses a highly variable nature as a function of the environment by utilizing all the physical variations of the microelectronic structure and of the substrate (temperature, voltage, position on the semiconductor substrate, etc.) giving rise to significant phase noise. Varying the delay introduced in the feedback loop of the oscillator as a function of some at least of the output bits of the LFSR creates a random feedback loop, which has the effect of adding frequency noise in the oscillator and of creating strong instability in the behavior of the LFSR making it possible to eliminate the deterministic nature of the sequence of numbers delivered as output by the LFSR.

BRIEF DESCRIPTION OF THE DRAWINGS

Other characteristics and advantages of the invention will become further apparent on reading the description which follows. The latter is purely illustrative and should be read in conjunction with the appended drawings, in which.

DETAILED DESCRIPTION OF THE DISCLOSURE

In what follows and in the Figures, the same elements bear identical references.

A pseudo-random number generator structure on which embodiments of the present invention are based, comprises an LFSR and an oscillator with an element introducing a determined delay.

Figure 1:
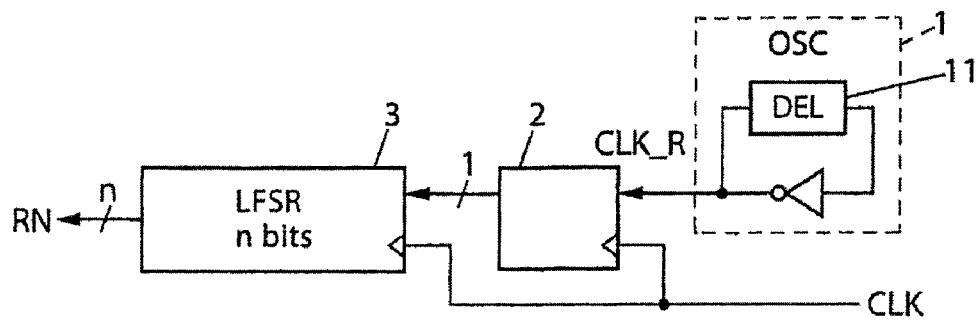
FIG. 1 is a diagram of a base structure of a pseudo-random number generator using an LFSR and an oscillator.
Figure 6:
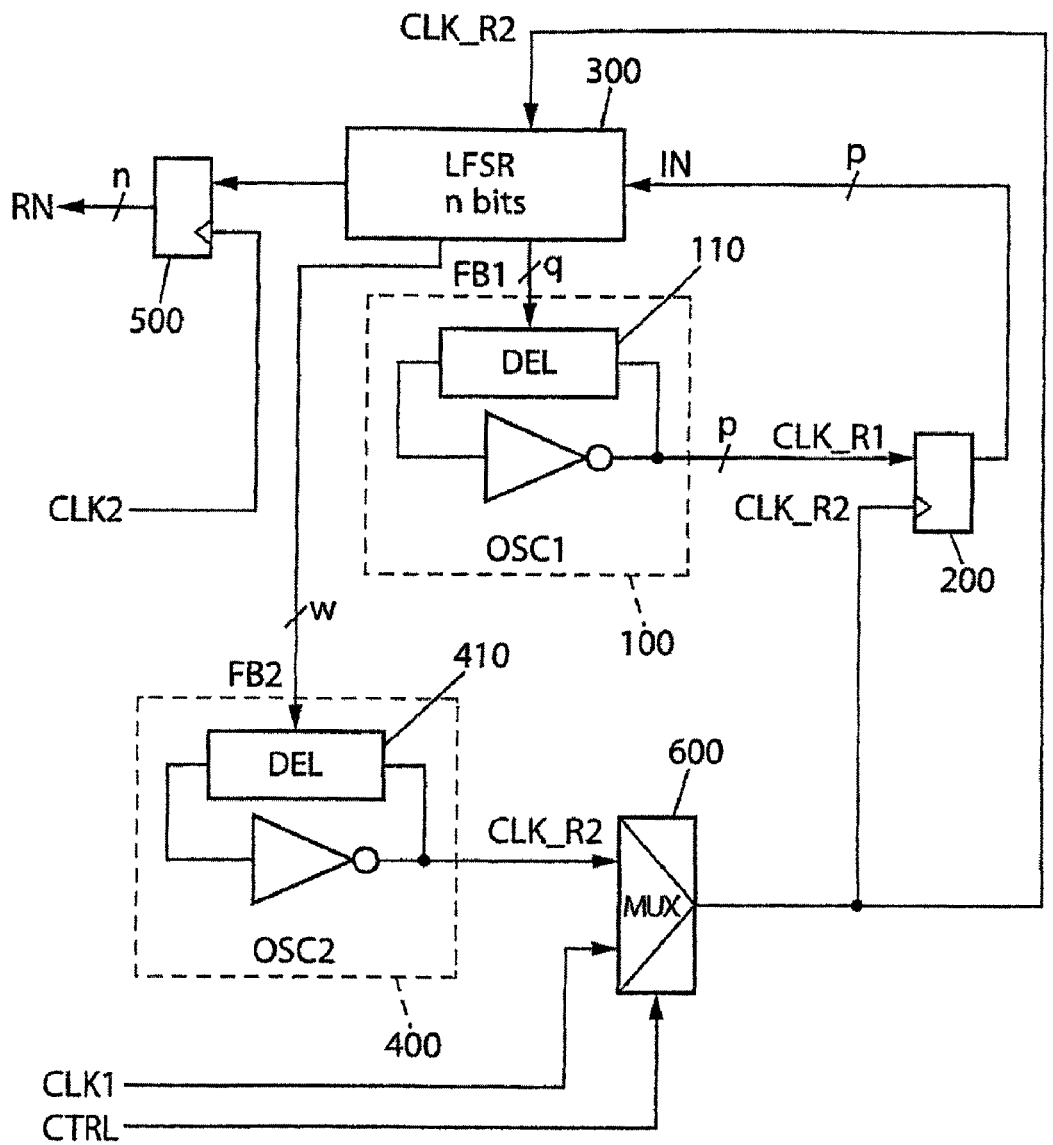
FIG. 6 is a diagram of a random number generator structure with two loops, according to second embodiments of the present invention.

With reference to FIG. 1, a conventional structure, shown for example in FIG. 6 of document U.S. Pat. No. 6,480,072 cited and discussed in the introduction, comprises a ring oscillator 1 whose output is looped with the input via a delay element 11. A ring oscillator is composed of a chain of an odd number (greater than unity) of inverter elements or stages, that is closed on itself. The delay element 11 is designed in such a manner that it introduces a delay that varies greatly as a function of the physical characteristics of the environment, especially but not solely the temperature of the circuit. It follows that the signal CLK_R delivered by the oscillator is unstable in phase, since it bears random phase noise. This is why the expression 'random clock signal' will sometimes be used hereinafter to designate the signal delivered by the oscillator.

The output of the oscillator 1 is sampled by a flip-flop 2 at the frequency of a clock signal CLK that is stable in phase, whose frequency is much lower than the frequency of the oscillator. The bit corresponding to the binary value delivered by the flip-flop 2 is provided in the guise of entropy bit on 1 bit as input to an n-bit LFSR 3, which is regulated by the clock signal CLK. The output of the LFSR produces pseudo-random numbers RN on n bits, which change value at each activation edge of the signal CLK. The accumulated value of the number RN depends on the natural evolution of the value of the polynomial processed by the LFSR at the tempo of the clock signal CLK, and furthermore the values of the entropy value injected at the slower tempo of the signal CLK_R.

Figure 2:
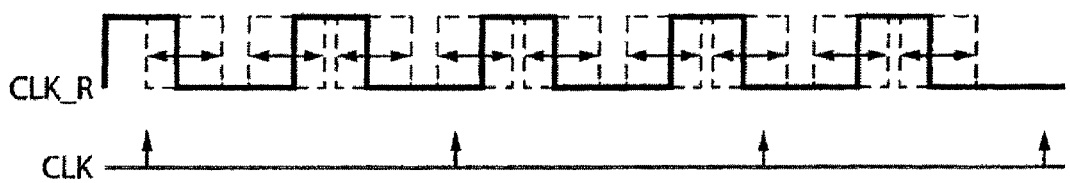
FIG. 2 gives timecharts illustrating the operating principle of the base structure of FIG. 1.

With reference to FIG. 2 in which the signal CLK_R and the signal CLK are represented respectively on the first line and on the second line, the phase noise of the signal CLK_R corresponds to a jitter which is manifested by a certain distribution of the temporal position of the edges of the signal CLK_R. When the frequency of the clock signal CLK is much lower than the nominal frequency of the signal CLK_R, the successive values of the signal CLK_R sampled at the frequency of the signal CLK constitute a sequence of binary values randomly equal to 1 or 0.

First embodiments of the random number generator will now be described with reference to the functional diagram of FIG. 3.

In these first embodiments, an oscillator 100 with high phase noise (OSC1) comprises a delay element 110. The oscillator can for example be a ring oscillator comprising a number z of stages placed in cascade, where z is an odd integer. The oscillator 100 comprises a number p of distinct outputs, each corresponding for example to the output of a respective inverter stage of the oscillator, where p is an integer such that $1 \leq p \leq n$ and $p \leq z$. These p outputs deliver a random clock signal CLK_R1 on p bits (in practice, there are in fact p parallel signals).

The signal CLK_R1 is provided as input to a sample and hold unit 200 which is activated by a clock signal CLK1 that is stable in phase. This sample and hold unit comprises for example p flip-flops in parallel, for example flip-flops of S-R, T, J-K, or D type, each receiving one of the p bits of the signal CLK_R1, respectively, on its data input. The p flip-flops of the sampler 200 are all activated by the signal CLK1. The function of this sampler is to synchronize the signal CLK_R1 with the clock signal CLK1.

The output of the sampler 200 delivers a signal IN on p bits (in practice, here also there are in fact p parallel signals), each corresponding to the output of a respective one of the flip-flops of the sampler 200. The signal IN is provided in the guise of entropy value on p bits, as input to an LFSR 300 with n bits. The LFSR 300 is activated by the clock signal CLK1. It processes a polynomial of degree n, and delivers as output a random number RN coded on n bits.

Out of the n bits of the number RN, a number q of bits form a feedback signal FB1 on q bits, where q is an integer such that $1 \leq q \leq n$. The q bits of the signal FB1, called feedback bits, are used to vary the delay introduced by the delay element 110 of the oscillator 100.

Figure 3:
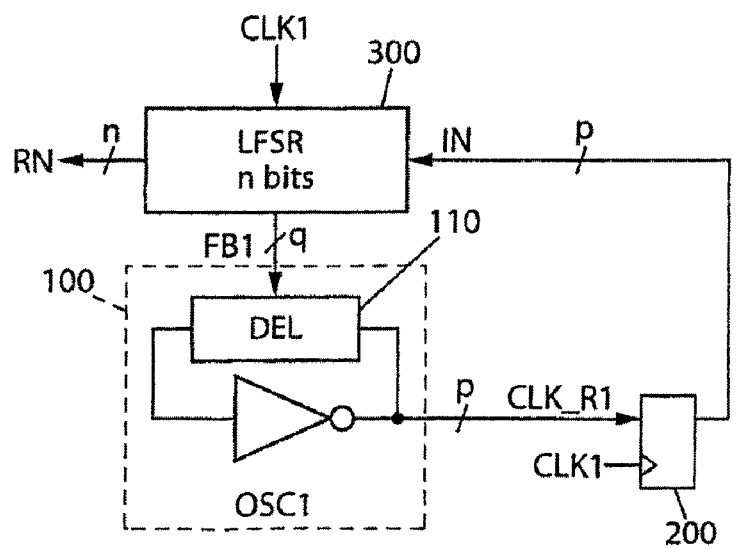
FIG. 3 is a diagram of a first looped random number generator structure, according to first embodiments of the present invention.

As is clearly seen in FIG. 3, a random feedback loop is thus created between the LFSR 300 and the oscillator 100. By virtue of this principle, the entropy value IN introduced as input to the LFSR is highly random, and makes it possible to generate numbers RN of n truly random bits. Specifically, the constituent elements of the structure, namely the oscillator 100 and the LFSR 300, are looped, each interacting with the other in a random manner, thereby guaranteeing very random overall operation. Thus, the numbers RN sampled at the output of the LFSR 300 at each draw are strongly independent and random, thereby enabling numerous consecutive draws in applications which so demand. This principle makes it possible to generate random numbers of good quality, whatever their size n. This also makes it possible to use an LFSR of lower degree than with a structure of the prior art, for equal quality of the numbers generated.

Figure 4:
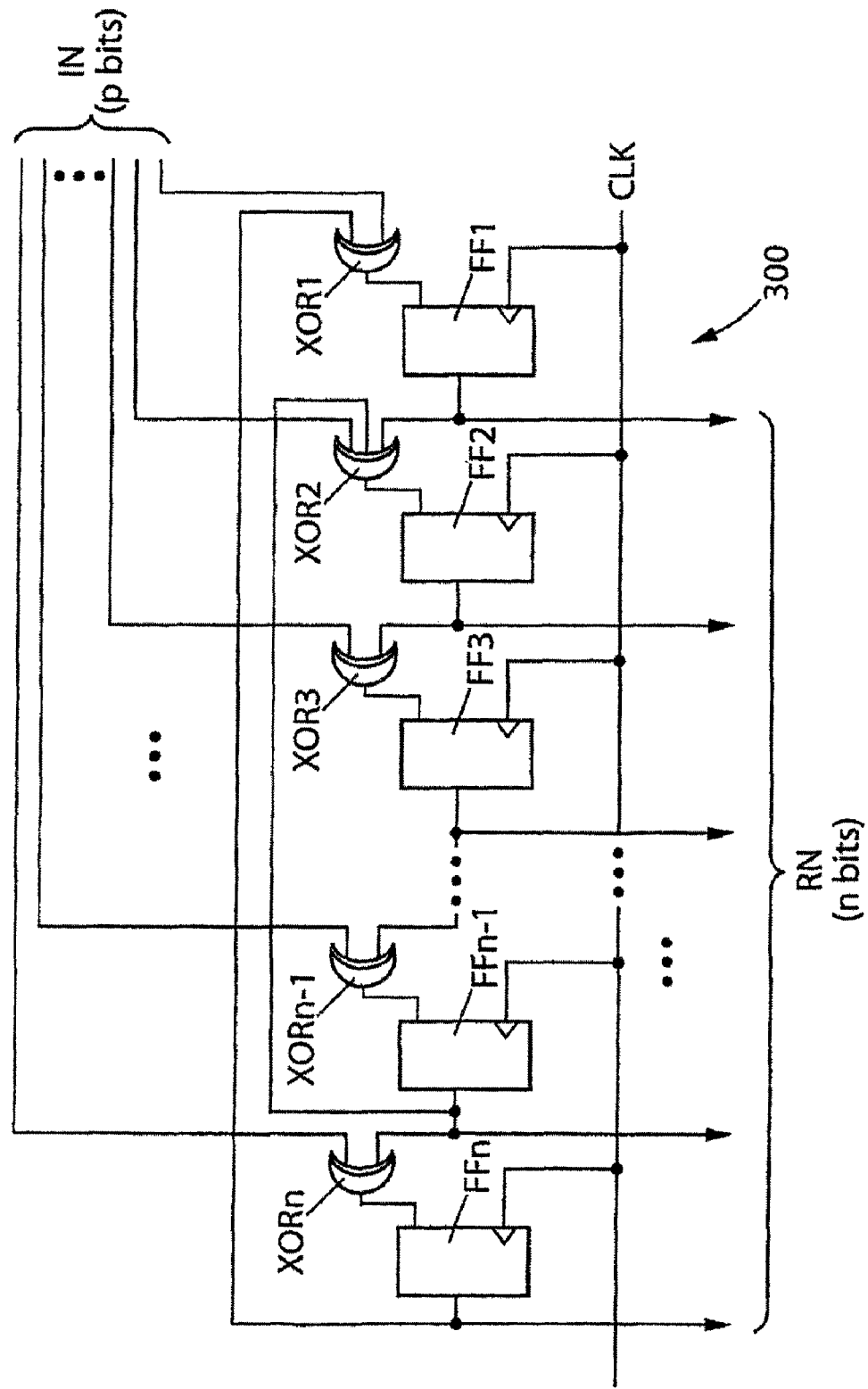
FIG. 4 is a diagram illustrating the principle of an LFSR with n inputs.

With reference to FIG. 4, the principle, known per se, of an LFSR with p inputs and n outputs will now be set forth.

The LFSR 300 comprises n flip-flops (for example D-type flip-flops) respectively FF1 to FFn coupled in cascade with one another. The output of the last flip-flop FFn is coupled to the input of the first flip-flop FF1 by way of a logic gate XOR1 of "Exclusive OR" type. Likewise, the output of each of the flip-flops FFi is linked to the input of the following flip-flop FFi+1 either directly or, as represented, via a logic gate XORi+1, for all i such that $1 \leq i \leq n-1$. Depending on the value of the polynomial processed by the LFSR, the output of a flip-flop may be linked to the input of another. In the example shown, the output of the flip-flop FFn−1 is thus coupled to the input of the flip-flop FF2 by way of the gate XOR2.

Likewise, the p bits of the entropy value IN are each delivered on the input of a respective one of the flip-flops FF1 to FFn via the corresponding logic gate, respectively XOR1 to XORn.

The n outputs of the LFSR, which deliver the n bits of the random number generated, are taken on the outputs of the n flip-flops FF1 to FFn, respectively.

It will be noted that, when the input of an arbitrary flip-flop FFi does not receive any of the p bits of the entropy value IN and is also not coupled to the output of a flip-flop other than the previous flip-flop FFi−1, then it may be coupled directly to the latter, that is to say without passing through the gate XORi−1, which may therefore be absent.

Figure 5:
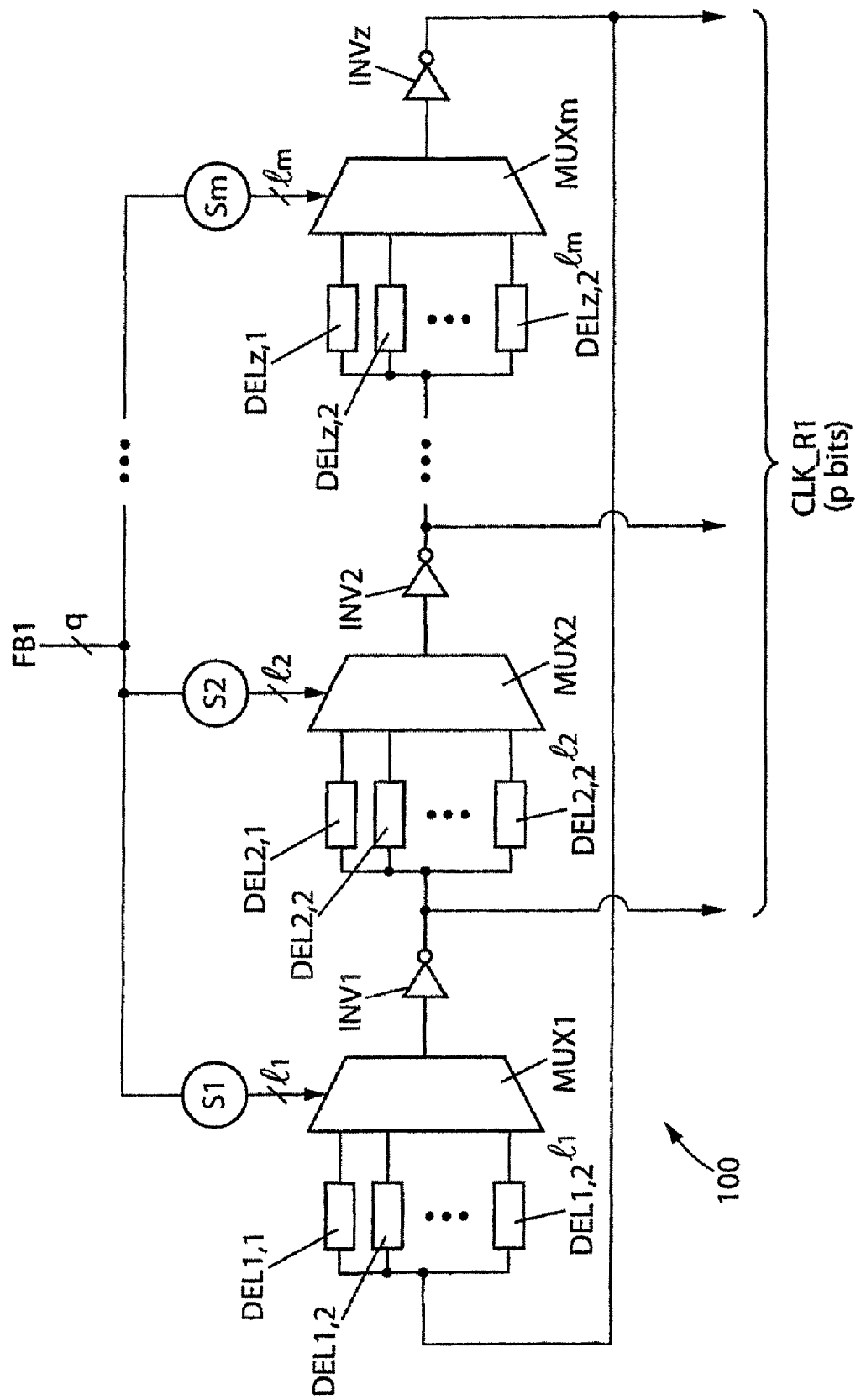
FIG. 5 is a diagram of an exemplary oscillator that may be used in embodiments of the present invention.

With reference to FIG. 5, the oscillator 100 according to embodiments is based on a ring oscillator. The oscillator thus comprises a number z of inverter stages placed in cascade, where z is an odd integer, respectively INV1 to INVZ. These inverter elements can be very simply embodied by CMOS technology. The oscillator additionally comprises a number p of distinct outputs each corresponding to the output of a respective inverter, where p is an integer such that $1 \leq p \leq n$ and $p \leq z$ (it is recalled that p corresponds to the number of bits coding the entropy values IN provided as input to the LFSR). These outputs deliver the p bits forming the signal CLK_R1.

The oscillator preferably comprises at least $2^q$ different delay elements, and at least one multiplexer configured to select one of the $2^q$ delay elements as a function of some at least of the q feedback bits. These delay elements can correspond to delay paths each introducing a respective delay. Each delay path comprises one or more logic elements having different characteristics (size, composition, etc.) so as to ensure a different delay for each of them as well as a different behavior in relation to the physical phenomena giving rise to a different variation of this delay affecting them (location on the semiconductor substrate, voltage, temperature, etc.) thus giving rise to a behavior of the phase noise that is different for the $2^q$ delays.

Still with reference to FIG. 5, an embodiment of the oscillator preferably comprises a number m of multiplexers, where m is an integer such that $1 \leq m \leq z$, each disposed upstream of one of the z inverter stages INV1 to INVz. These multiplexers MUX1 to MUXm are each configured to select one of the $2^q$ delay elements as a function of some at least of the q feedback bits. The application of a variable delay is thus obtained at m different places in the oscillator, thereby multiplying the possible configurations, and therefore helping to increase the randomness of the logic states of the signal CLK_R1 delivered by the oscillator.

In an embodiment, the m multiplexers are configured to each select a determined one out of a number $2^{l_k}$ of the $2^q$ delay elements as a function of a number $l_k$ of bits from among the q feedback bits, where $l_k$ is an integer such that $1 \leq l_k \leq q$ for all k such that $1 \leq k \leq m$. Stated otherwise, the $2^q$ delay elements are distributed between the m multiplexers MUX1 to MUXm, this amounting to decreasing the total number of delay elements to be provided relative to a structure in which each multiplexer would make it possible to select one out of $2^q$ delay elements (so that in total $m \times 2^q$ delay elements would in fact be necessary). In FIG. 5, the $2^{l_k}$ delay elements associated with each multiplexer MUXk are referenced DELk,1 to DELk,$2^{l_k}$, respectively, for all k such that $1 \leq k \leq m$.

For example, for all k such that $1 \leq k \leq m$, the $l_k$ of bits which serve to select the delay element applied by the multiplexer MUXk, are obtained on the basis of the q feedback bits by way of a logic function respectively Sk. The logic functions S1 to Sm can for example be embodied as hard-wired combinatorial logic.

In an embodiment $l_k = q/m$ for all k such that $1 \leq k \leq m$. Stated otherwise, the $2^q$ delay elements are equitably distributed between the m multiplexers MUX1 to MUXm. This simplifies the design of the circuit, by making it possible to use masks with repetitive patterns for fabrication on the semiconductor substrate.

In an embodiment, it is additionally provided that m=z, that is to say each inverter stage of the ring oscillator is coupled to the previous stage via a delay element that can vary as a function of all or some of the q feedback bits. The size of the ring oscillator is thus optimized.

Other embodiments of the oscillator are of course conceivable. It does not have to be a ring oscillator. It suffices that the oscillator comprise an element that can be varied as a function of the q feedback bits so as to influence in a random manner the jitter (phase noise) of the signal generated by the oscillator.

Likewise, it is possible to have more than one oscillator for generating the p bits forming the entropy value injected into the LFSR. Thus, the oscillator 100 can be replaced with a number p of distinct oscillators each having a respective output, where p is an integer such that $1 \leq p \leq n$, providing one of the bits of the entropy value IN.

Each of the p oscillators can for example be a ring oscillator which comprises a number $z_i$ of stages in cascade, where $z_i$ is a determined integer, at least $2^{q_i}$ different delay elements, where $q_i$ is an integer such that $1 \leq q_i \leq q$, and at least one multiplexer configured to select one of the $2^{q_i}$ delay elements as a function of some at least of said $q_i$ feedback bits, where i is an index such that $1 \leq i \leq p$ making it possible to distinguish between the p oscillators.

Such an oscillator would have the same structure as the oscillator represented in FIG. 5 already described (in which the index i would be added to the letters q, z and m), but would have only a single output corresponding for example to the output of the last inverter element INV$z_i$. This oscillator is not described in detail again here, but can be set forth according to the same embodiments as that of FIG. 5, thereby making it possible to obtain the corresponding advantages which were indicated previously.

Stated otherwise, each ring oscillator can comprise a number $m_i$ of multiplexers, where $m_i$ is an integer such that $1 \leq m_i \leq z_i$ for all i such that $1 \leq i \leq p$, each configured to select one of the $2^{q_i}$ delay elements as a function of some at least of the $q_i$ feedback bits.

The $m_i$ multiplexers, for $1 \leq m_i \leq z$, can each be configured to each select one out of a number $2^{j_i}$ of the $2^{q_i}$ delay elements as a function of a number $j_i$ of bits from among the q feedback bits, where $j_i$ for all i such that $1 \leq i \leq p$, is an integer such that $1 \leq j_i \leq q_i$.

Preferably, we choose $j_i = q/m_i$ for all i such that $1 \leq i \leq p$.

Yet more advantageously, we choose $m_i = z_i$ for all i such that $1 \leq i \leq p$.

Other embodiments of the generator make it possible to further increase the randomness of the numbers generated, doing so right from the first draws (that is to say without needing to wait for the polynomial processed by the LFSR to have progressed for a certain time).

These second embodiments of the random number generator now will be described with reference to the functional diagram of FIG. 6, in which the same elements as in FIG. 3 bear the same references and are not again described in detail.

The generator comprises here, as well as the oscillator 100, an additional oscillator 200 (OSC2) having at least one delay element 410. The element 410 introduces a determined delay, which varies as a function of a number w of feedback bits from among the n output bits of the LFSR, where w is an integer such that $1 \leq w \leq n$. These w feedback bits form a feedback signal FB2. They may or may not, wholly or partly, be the same as the q feedback bits forming the feedback signal FB1 provided to the oscillator 100.

For the remainder, the oscillator 400 can be of the same nature and be embodied in the same manner as the oscillator 100 described above with reference to the diagram of FIG. 3. Stated otherwise, the oscillator 400 can be a ring oscillator which exhibits the characteristics of the ring oscillator 100 previously described. The reader is therefore referred back to this description, in which it is simply necessary to replace the letter q with the letter w (that is to say it is necessary to replace the q bits of FB1 with the w bits of FB2).

The signal CLK_R2 delivered by the oscillator 400 is a random clock signal within the sense mentioned above. It is used instead of the signal CLK1 of FIG. 3, to regulate the sampler 200 and the LFSR 300. Stated otherwise, the signal CLK_R2 serves as clock signal for sampling the signal CLK_R1 delivered by the oscillator 100.

Given that the oscillator 400 is looped with the LFSR 300, the signal CLK_R2 exhibits very random jitter. This randomness in phase and in frequency affecting the sampling signal for the signal CLK_R2, which itself is affected by highly random phase noise, very substantially enhances the randomness of the entropy values IN injected as input into the LFSR at the tempo of the signal CLK_R2. As readily noted, the generator according to these embodiments in fact comprises two loops which inject noise, one through the input signal and another through the clock of the LFSR, whereas that of FIG. 3 comprises only one. This makes it possible to increase the quality, that is to say the randomness, of the numbers RN delivered as output from the LFSR.

Advantageously, the second loop involves a variation in the operating speed of the LFSR, which results in temperature variations of the circuit, this helping to add vagary which loops back again, accelerating the parallel phenomena and rendering the behavior of the structure unpredictable.

It will be noted that the numbers RN are preferably synchronized with a clock signal that is stable in phase. For this purpose, the generator can comprise a sample and hold unit with n bits 500, whose n data inputs are coupled to the n outputs of the LFSR 300, whose clock input receives a signal CLK2 that is stable in phase (as is the signal CLK1 of FIG. 3), and whose n stabilized outputs deliver the n bits of the number RN generated.

In an embodiment in accordance with FIG. 6, the sampling signal for the first random clock signal CLK_R1 has a frequency that is selectively stable (as in the case of FIG. 3) or unstable (as described above). Stated otherwise, it is possible to select single-loop operation or double-loop operation, as a function of the expected performance, knowing that the double-loop mode of operation consumes more current. For this purpose, the generator can comprise a multiplexer 600, a first input of which receives the signal CLK1 (clock signal that is stable in phase) of FIG. 3, a second input of which receives the signal CLK_R2 delivered by the second oscillator (random clock signal), and a control input of which receives a control signal CTRL ensuring the selection of one or the other of the signals CLK1 and CLK_R2 in the guise of sampling signal for the random clock signal CLK_R1 delivered by the first oscillator.

The invention claimed is:

1. A random number generator comprising:
    an bits linear feedback shift register, or LFSR having an input and n outputs for outputting n output bits, where n is a given integer;
    at least one oscillator having an output, a feedback loop and at least one delay element introducing a variable delay into said feedback loop; and
    at least one sample and hold unit having at least one input coupled to the output of the oscillator, and at least one output coupled to the input of the LFSR, and a clock input receiving a sampling clock signal at a much lower frequency than the frequency of the oscillator,
    the generator being configured to vary the delay introduced by the delay element in the feedback loop of the oscillator as a function of a number q of feedback bits from among the n output bits of the LFSR, where q is an integer such that $1 \leq q \leq n$.

2. The random number generator of claim 1, wherein:
    the oscillator is a ring oscillator which comprises a number z of stages placed in cascade, where z is a determined odd integer, and a number p of distinct outputs each corresponding to the output of a respective stage, wherein p is an integer such that $1 \leq p \leq n$ and $p \leq z$;
    the LFSR comprises p inputs for receiving an entropy value on p bits; and
    the sample and hold unit comprises p inputs respectively coupled to the p outputs of the ring oscillator, and p outputs respectively coupled to the p inputs of the LFSR for delivering the entropy value on p bits.

3. The random number generator of claim 2, wherein the ring oscillator comprises at least $2^q$ different delay elements, and at least one multiplexer configured to select one of the $2^q$ delay elements as a function of some at least of the q feedback bits.

4. The random number generator of claim 3, wherein the ring oscillator comprises a number m of multiplexers, where m is an integer such that $1 \leq m \leq z$, each configured to select one of the $2^q$ delay elements as a function of some at least of the q feedback bits.

5. The random number generator of claim 4 wherein $m = z$.

6. The random number generator of claim 4, wherein the m multiplexers are configured to each select one out of a number $2^{l_k}$ of the $2^q$ delay elements as a function of a number l of bits from among the q feedback bits, where l is an integer such that $1 \leq l_k \leq q$ for all k such that $1 \leq k \leq m$.

7. The random number generator of claim 6, wherein $l_k = q/m$ for all k such that $1 \leq k \leq m$.

8. The random number generator of claim 1, comprising a number p of distinct ring oscillators, where p is an integer such that $1 \leq p \leq n$, each having a respective output; wherein
    the LFSR comprises p inputs for receiving an entropy value on p bits; and
    the sample and hold unit comprises p inputs respectively coupled to the p respective outputs of the p ring oscillators, and p outputs respectively coupled to the p inputs of the LFSR for delivering the entropy value on p bits.

9. The random number generator of claim 8, wherein each of the p ring oscillators comprises:
    a number $z_i$ of stages in cascade, where $z_i$ is a determined integer for all i such that $1 \leq i \leq p$;
    at least $2^{q_i}$ different delay elements, where $q_i$ is an integer such that $1 \leq q_i \leq q$, for all i such that $1 \leq i \leq p$; and
    at least one multiplexer configured to select one of the $2^{q_i}$ delay elements as a function of some at least of the $q_i$ feedback bits.

10. The random number generator of claim 9, wherein each ring oscillator comprises a number $m_i$ of multiplexers, where $m_i$ for $1 \leq i \leq p$ is an integer such that $1 \leq m_i \leq z_i$, each configured to select one of the $2^{q_i}$ delay elements as a function of some at least of the $q_i$ feedback bits.

11. The random number generator of claim 10, wherein the $m_i$ multiplexers, for $1 \leq m_i \leq z$, are each configured to each select one out of a number $2^{j_i}$ of the $2^{q_i}$ delay elements as a function of a number $j_i$ of bits from among the q feedback bits, where $j_i$ is an integer such that $1 \leq j_i \leq q$, for all i such that $1 \leq i \leq p$.

12. The random number generator of claim 11, wherein $j_i = q/m_i$ for all i such that $1 \leq i \leq p$.

13. The random number generator of claim 10, wherein $m_i = z_i$ for all i such that $1 \leq i \leq p$.

14. The random number generator of claim 1, wherein the sampling clock signal has an unstable frequency.

15. The random number generator of claim 1, wherein the sampling clock signal has a selectively stable or unstable frequency.

16. The random number generator of claim 15, comprising an additional oscillator having at least one delay element introducing a variable delay into its feedback loop which varies as a function of a number w of feedback bits from among the n output bits of the LFSR, where w is an integer such that $1 \leq w \leq n$.

17. The random number generator of claim 16, wherein the additional oscillator is a ring oscillator of same structure and arranged the same way as the other oscillator.

18. Method for generating random numbers by using:
a n bits linear feedback shift register, or LFSR, having an input and n outputs for outputting n output values, where n is a determined integer;
at least one oscillator having an output, a feedback loop and at least one delay element introducing a variable delay into said feedback loop; and
at least one sampler having at least one input coupled to an output of the oscillator, and at least one output coupled to the input of the LFSR, and a clock input receiving a sampling clock signal at a much lower frequency than the frequency of the oscillator,
wherein the delay introduced by the delay element in the feedback loop of the oscillator is varied as a function of a number q of feedback bits from among the n output bits of the LFSR, where q is an integer such that $1 \leq q \leq n$.

19. The method of claim 18, wherein an entropy value on p bits generated on the basis of p distinct outputs of the oscillator or on the basis of the respective outputs of p distinct oscillators is provided as input to the LFSR.

20. The method of claim 18, wherein the sampling frequency is produced by using an additional oscillator having a delay element introducing a variable delay into its feedback loop, and wherein the delay introduced by the delay element in the feedback loop of the additional oscillator is varied as a function of a number w of feedback bits from among the n output bits of the LFSR, where w is an integer such that $1 \leq w \leq n$.

* * * * *